Figures 1, 2:
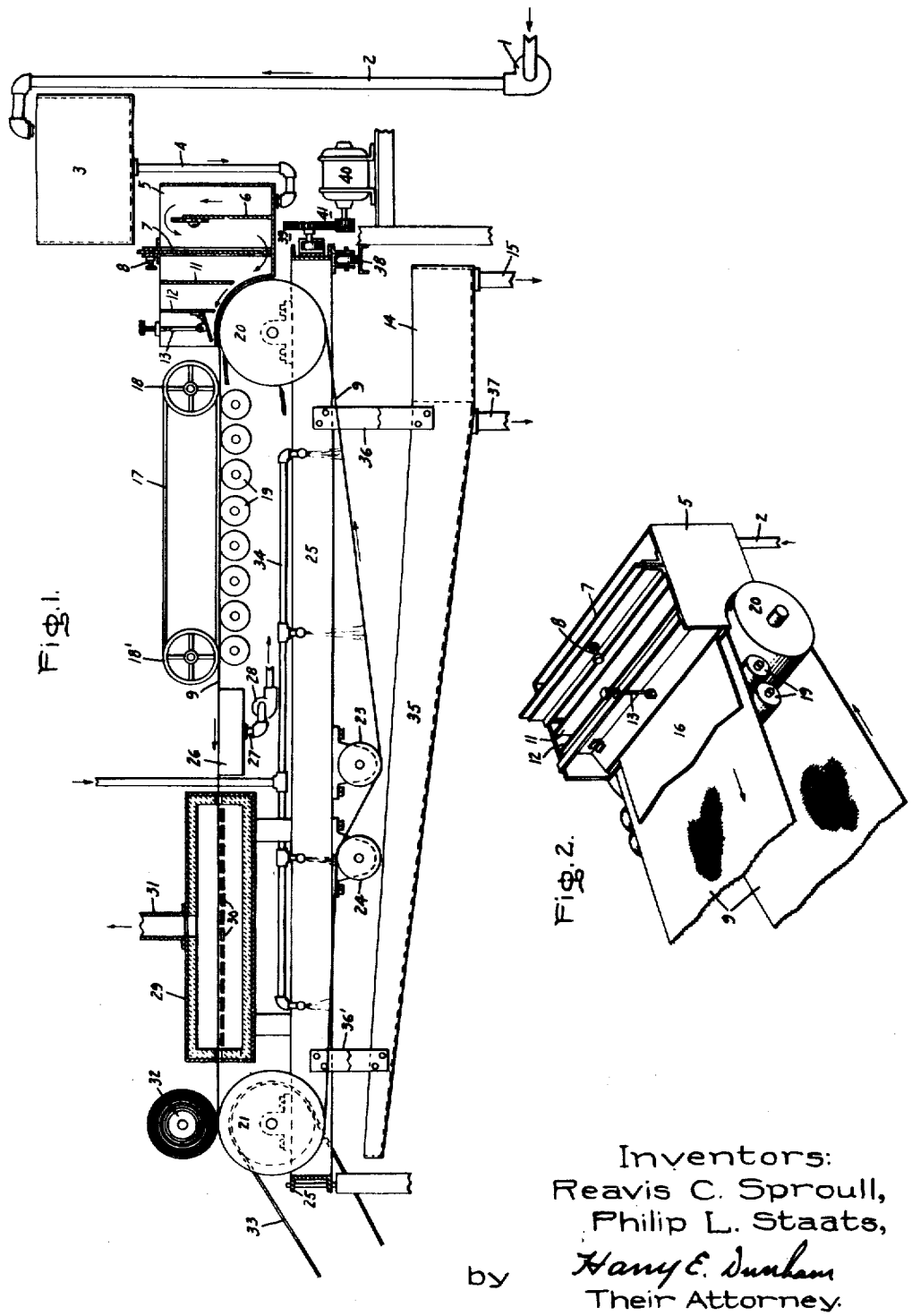

Inventors:
Reavis C. Sproull,
Philip L. Staats,
by Harry E. Dunham
Their Attorney.

April 18, 1950 — R. C. SPROULL ET AL — 2,504,744
GLASS FIBER SHEET MATERIAL
Filed June 3, 1944 — 2 Sheets-Sheet 2
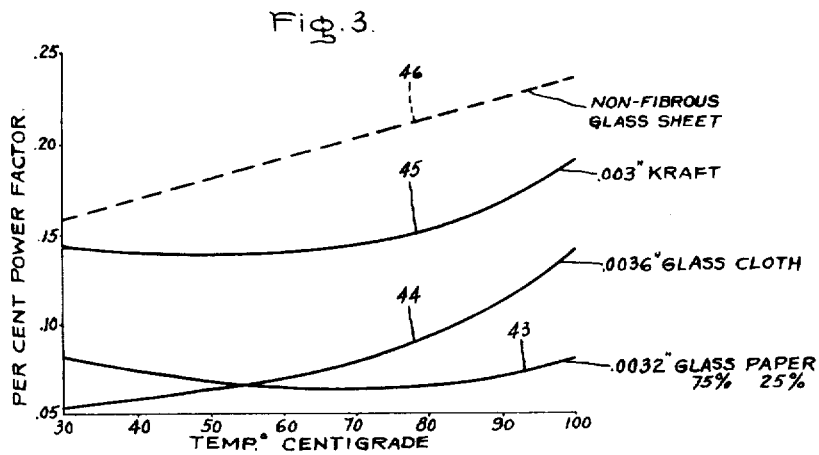
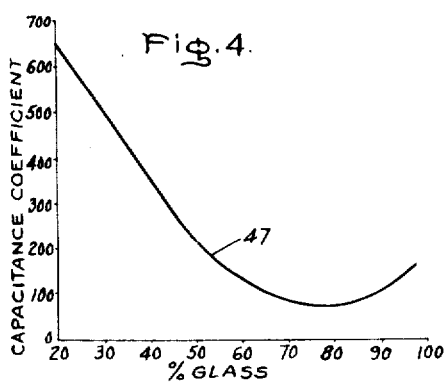
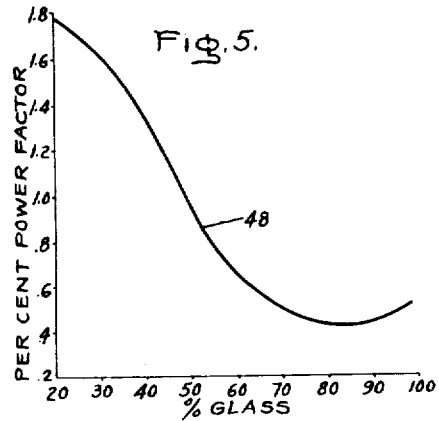
Inventors:
Reavis C. Sproull,
Philip L. Staats,
by Harry E. Dunham
Their Attorney.

Patented Apr. 18, 1950

2,504,744

UNITED STATES PATENT OFFICE 2,504,744

GLASS FIBER SHEET MATERIAL

Reavis C. Sproull and Philip L. Staats, Pittsfield, Mass., assignors to General Electric Company, a corporation of New York Application June 3, 1944, Serial No. 538,573

1 Claim. (Cl. 92—3)

The present invention comprises material consisting preponderantly of glass fibers. As distinguished from so-called "glass cloth" the sheet material embodying our invention is of paper-like character, the fibers having a heterogeneous or random distribution, that is, without major orientation.

Inorganic fibers in general and glass fibers in particular are characterized by smoothness, brittleness, inability to hydrate when beaten in water, and lack of tendency to cling to one another when such a mixture is spread on a continuously moving screen. Although glass fibers have been woven to form cloth-like materials, it has not been possible heretofore to prepare from such fibers sheet products containing a high percentage of glass fibers which are arranged heterogeneously as in ordinary paper.

We have discovered that glass fibers having a diameter no greater than about 0.0003" and of short linear extension, that is, in general having an average maximum length of about 20 mils, when associated with hydrated cellulose fibers under suitable conditions can be fabricated into coherent paper-like sheet material. The hydrated cellulose fibers function as the sole bonding agent for the glass fibers. As will be further explained this product is particularly adapted for dielectric purposes in electric apparatus. Sheet material containing about 60 to 98 per cent of glass fiber has unexpected and advantageous electrical characteristics as stated hereinafter. In particular capacitors containing dielectric elements consisting of such material operate with low per cent factor and high capacitance. These characteristics are substantially constant over a range of temperatures and frequencies.

Our invention will be more fully explained in connection with the accompanying drawings in which Fig. 1 is a somewhat conventionalized side elevation of a machine for making our improved product; Fig. 2 is a perspective more detailed view of a fiber-distributing means; and Figs. 3, 4 and 5 are graphs of electrical characteristics of our improved products.

Glass fibers of suitably small diameter to insure flexibility, and preferably consisting of borosilicate glass having a low alkali content, are employed for the purposes of our invention. Commercial glass fibers, if coated with a lubricant, should be treated to remove the lubricant, for example, with a suitable solvent or by any other suitable method. The clean uncoated fibers are cut into short pieces having an average and nearly uniform length of about 300 mils. The subdivided fibers are suspended in water with a chosen amount of cellulose fiber. The amount of glass fiber should substantially preponderate over the cellulose fiber and preferably should be as high as about 70 per cent and in some cases as high as 97 or 98 per cent. The cellulose fibers should preferably consist of kraft, or other chemical cellulose pulp, such as used in paper-making. The glass fibers may have a diameter of about 0.00002 to 0.00030 inch. The resulting mixture is beaten in the presence of a large excess of water until the length of the glass fibers is reduced to a maximum average of about 20 mils, and thorough admixture of the two types of fibers has been insured.

The cellulose fibers may be subjected to a preliminary beating so that when the beating of the admixture of the glass and cellulose fibers is completed the latter will have a "freeness" within a range of about 50 to 99. The "freeness" is chosen within narrow limits depending on the end use of the material. The "freeness" which may be determined by the Schopper-Riegler test apparatus is a measure of hydration of the cellulose fiber. A cellulose fiber which is highly hydrated is gelatinous in consistency and in paper-making terminology has a low degree of "freeness." The Schopper-Riegler apparatus is described in the paper Trade Journal, vol. 82, p. 58 (Technical Section p. 6), 1926. A scale of freeness for this apparatus was adopted by the Paper Institute, Appleton, Wis., see Tentative Method 414, 1940.

When the material to be manufactured is to be used as spacing and dielectric material between the plates of capacitors the hydrated fibrous cellulose should have a freeness of about 93 to 99. On the other hand, if the material to be manufactured is to be used as impregnating base for the production of insulating board then the hydrated fibrous cellulose preferably should have a freeness in the range of about 50 to 60.

Example 1

When it is desired to fabricate a paper containing about three parts of glass fiber and one part cellulose fiber, then 750 parts by weight of kraft wood pulp are beaten to a 94 per cent degree of freeness. The kraft pulp may be prepared as described in Allen Patent 1,850,702 of March 22, 1932. To this pulp are added 2250 parts by weight of glass fibres having a diameter of about .00028" (.028 mil), and being cut to a length of about ¼". The fiber suspension is diluted to a consistency of 0.30 per cent and beaten for three to ten minutes, thereby reducing the average length of the glass fiber to about .020". This beating time is governed by the consistency, pressure of the roll, speed of the roll, volume of stock and original fiber length. The resulting pulp is diluted with water, while stirring, to a consistency of 0.10 per cent. This pulp mixture can be converted into a paper-like product in apparatus such as shown in Figs. 1 and 2 of the accompanying drawings.

*Example 2*

To 75 parts by weight of the pulp beaten to the 80 per cent freeness 675 parts of glass fiber may be added, the dimensions of the latter being the same as previously stated. The sheet product made from such a mixture is particularly suitable for insulating purposes when saturated with resin and pressed as will be described.

*Example 3*

To 15 parts by weight of kraft pulp beaten to 98 per cent freeness are added 490 parts by weight of glass fiber. This mixture with the addition of sufficient water to result in a consistency of 4 per cent is beaten for about five minutes. The beating reduces the glass fiber length. The beaten pulp is introduced into the head box of a machine about to be described. The resulting sheet product is suitable for various fields of use. It is non-inflammable and is resistant to high temperatures. It may be impregnated with resins as described hereinafter.

A pulp mixture of glass and cellulose fiber may be continuously fabricated into sheet form on a paper-making machine, such as shown in the drawing. The pulp mixture is introduced by a pump 1, Fig. 1, through a conduit 2 into a tank 3, from which it flows through a second conduit 4 into a head box 5. The pulp flows in a sinuous path through the head box, past a series of baffle plates, two being illustrated at 6 and 7. The height of the baffle 7 is adjustable vertically to give a variable clearance with respect to the bottom of the head box. A hand-operated or automatic clamp 8 is provided to set the baffle in a fixed position. The pulp is distributed upon a moving wire screen 9 which is best shown in Fig. 2. Uniform distribution of the pulp upon the screen 9 is insured by the downwardly projecting baffles 11, 12 which direct the pulp against the screen as it flows through the short clearance space between the lower end of these baffles and the screen. The baffle 12 has an adjustable section, the clearance of which may be regulated by the hand-operated rod 13. The baffles provide for agitation in the head box and thereby maintain uniform suspension of the two types of fibers in the head box. Thereby the fibers are deposited on the screen in a constant ratio. The water and fiber (white water) escaping through the screen is collected by a trough 14 from which it is returned to the tank 3 by a conduit 15.

The wet pulp is deposited on the screen as a layer 16, Fig. 2, the water draining through the screen. A well-defined margin for the deposited pulp is insured by the marginal deckle straps bearing on the screen, one of which is shown at 17, Fig. 1, as a loop passing over the pulley wheels 18 and 18'. A series of rollers 19 bearing on the screen 16 from below, and turning with it, support and maintain the forward motion of the screen which passes over large pulley wheels 20, 21 and small pulley wheels, 23, 24, all of which are supported on a framework 25. Excess water not removed by drainage is removed from the screen by a suction box 26 which communicates with a conduit 27 connected with a pump 28.

The deposited pulp layer which still is too wet to be handled next passes through an electrically heated drying oven 29 which contains a plurality of electric heating units, one series of which has been indicated at 30. Water vapor escapes from the oven by a vent pipe 31. The dry sheet material which issues from the dryer 29 is wound on a pick-up roll 32, the latter being diagrammatically indicated in the drawing.

As the screen returns over the pulley 21 which is driven by a belt 33 (the source of power not being shown) it passes beneath the framework 25 under water sprays delivered by the branched pipes 34 whereby the screen is washed. The water is collected by a drainage sump 35 which is attached to the frame 25 by the brackets 36, 36'. From the sump the drainage liquid is carried away by a conduit 37. The screen 9 may be gently oscillated from side to side upon the roller 38 by an eccentric rocking mechanism 39 in order to insure even deposition of the pulp. The rocking mechanism is operated by the motor 40 which is connected by the gears 41.

Sheet material made in accordance with our invention is highly absorptive of liquids. Hence, it may be impregnated readily with liquids, as for example, with solutions of resinous materials, or with electrolytes. The impregnated product may serve for dielectric purposes in electric capacitors, also as insulation for metal conductors and as spacers between conductors.

In the sheet product produced by the described method and apparatus the glass and cellulose fibers are arranged in heterogeneous relation without major orientation. When such sheet product is to be used for dielectric purposes its thickness ordinarily should be about .3 to 20 mils. Although the relative percentage of glass and cellulose fibers may be varied considerably, as heretofore indicated, for dielectric purposes a satisfactory proportion comprises about three parts of glass fibers and one part of cellulose fibers.

As shown by the graph 43, Fig. 3, an impregnated sheet product consisting by weight of approximately three parts glass fiber and one part cellulose fiber is characterized by a low and substantially constant power factor over a range of temperatures of about 30 to 100° C. The measurements on which graph 43 is based were made at 60 cycles. As indicated by graph 44 a woven sheet material or cloth consisting of glass fibers of approximately the same composition has a power factor characteristic which rises with increase of temperature. On the other hand, kraft paper as indicated by the graph 45 has a materially higher power factor characteristic. It is surprising that material consisting of a combination of glass and cellulose fibers should have a power factor characteristic materially lower than that of kraft paper and lower than glass cloth at elevated temperatures. Non-fibrous glass sheet material having approximately the same composition as the glass fibers of the chosen examples has still higher power factor characteristic as indicated by the graph 46. The power factor of the glass sheet stock rises as shown with rise of temperature over the given range. Although the power factor characteristic of glass cloth has been shown for its comparative value, glass cloth is not well adapted for dielectric use because of the regular orientation of the fibers. The dielectric strength of glass cloth is relatively low.

Sheet products embodying our invention when impregnated with a suitable resinous material are characterized by lower power losses (per cent power factor) and more stable capacitance (lower capacitance coefficient) than sheet products having a lower glass content. In Fig. 4 is plotted graph 47 which indicates somewhat conventionally the average capacitance coefficients of a number of samples of sheet material containing a glass content varying from 20 per cent upward and being impregnated with polyvinyl carbazole.

The capacitance coefficient is a measure of the change in capacitance over a range of temperatures of a capacitor containing the impregnated material as a dielectric element. An equation for calculating the capacitance-temperature coefficient may be expressed as follows $$\frac{C-c}{C \times (T-t)}$$

C and c represent capacitance values at the extremes of a temperature range, C being the capacitance at the lower temperature and c the capacitance at the higher temperature. T and t are the respective limits of temperature.

In Fig. 5 is shown somewhat conventionally by a graph 48 the average per cent power factor of impregnated material containing glass fibers over a range of 20 to 98 per cent. These results were measured at 1.03 megacycles.

The power factor of a material is the cosine of the dielectric phase angle or the sine of the dielectric loss angle. The per cent power factor in less technical language is the difference between the input energy and the output energy divided by the input energy and multiplied by 100.

It appears that both the capacitance coefficient and the power factors are lowest for glass contents in a range of about 60 to 95 per cent.

The advantages of our new sheet material for impregnation with resins, or other liquefiable or liquid substances is illustrated by the following products. A sheet material, such as described under Example 1, containing about 75 per cent glass fiber and 25 per cent wood fiber by weight and having a thickness of about 1.5 mil may be impregnated with a suitable solution of polyvinyl carbazole. For example, a 10 to 15 per cent solution of the carbazole in a suitable solvent, for example benzene, is satisfactory. The sheets upon drying may be dipped into a 5 to 10 per cent solution of polyvinyl carbazole. The sheets then are air dried. Single sheets are heated under a mechanically applied pressure of 5 to 15 pounds per square inch for about 1 minute at 190 to 200° C. This first heating step is followed by a second heating step under pressure of about 4000 pounds per square inch applied for 5 seconds at a temperature of 195 to 204° C. Two such sheets are placed between metal foil and pressed at about 4000 pounds per square inch for 5 seconds at a temperature within the range of 195 to 204° C.

The resulting product has a thickness within the range of .003 to .0035". It has a dielectric strength of 750 to 1200 volts per mil, a maximum power factor of about .4 per cent or less. In some cases the power factor is as low as 0.15 per cent when measured at 200 kilocycles. The temperature capacitance coefficient is about .01 per cent or less at 200 kilocycles over a temperature range of minus 10° C. to 110° C.

The glass fiber products herein described also may be saturated with silicone compositions of the type described in Rochow U. S. Patents 2,258,218 and 2,258,222 issued October 7, 1941. For example, a suitable silicone compound is dissolved in a suitable volatile solvent, for example, toluene, in order to thoroughly impregnate the glass fiber sheets. The impregnated material is air dried for about one-half hour. It is subjected thereupon to moderate heating (e. g. 60° C.) for another half hour to more completely remove the solvent. Several such sheets may be superimposed and then pressed at a pressure of about 1000 pounds per square inch and at a temperature of about 190° C. Under the influence of this high pressure and temperature the several sheets become united to form a strong plate of high heat resistance and high impact strength. Such a composite sheet product can be used for various electrical insulating purposes requiring a product capable of resisting temperatures of 200° C. or higher.

Glass fiber sheets made in accordance with our invention when impregnated with alkyd resins have advantageous properties. For example, our sheet product when impregnated with a castor oil-modified glyceryl phthalate resin has excellent flexibility, high dielectric strength, good water-repellency and as much as 200 per cent stretch. Such a compounded sheet product is suitable for use as turn insulation and for insulation where flexibility and stretch is needed.

What we claim as new and desire to secure by Letters Patent of the United States is:

Sheet material which is suitable for capacitor dielectric purposes consisting of about 75 per cent of uncoated glass fibers having a diameter of about 0.3 of a mil and a maximum average length of about 20 mils and about 25 per cent of kraft wood fibers, said fibers being arranged in heterogeneous relation without major orientation.

REAVIS C. SPROULL.
PHILIP L. STAATS.

REFERENCES CITED

The following references are of record in the file of this patent:

UNITED STATES PATENTS

| Number | Name | Date |
| --- | --- | --- |
| 2,072,465 | Reppe | Mar. 2, 1937 |
| 2,108,761 | Becher | Feb. 15, 1938 |
| 2,217,005 | Clapp | Oct. 8, 1940 |
| 2,227,637 | Englehardt | Jan. 7, 1941 |
| 2,322,214 | Kirkwood | June 22, 1943 |
| 2,327,991 | Betts | Aug. 31, 1943 |
| 2,389,678 | Merrell | Nov. 27, 1945 |

FOREIGN PATENTS

| Number | Country | Date |
| --- | --- | --- |
| 113,887 | Australia | June 24, 1940 |
| 1,922 of 1908 | Great Britain | Aug. 13, 1908 |
| 497,059 | Great Britain | Dec. 8, 1938 |

Certificate of Correction

Patent No. 2,504,744                                                      April 18, 1950

REAVIS C. SPROULL, ET AL.

It is hereby certified that error appears in the printed specification of the above numbered patent requiring correction as follows:

Column 4, lines 48 and 49, for the word "impregnated" read *unimpregnated*;

and that the said Letters Patent should be read with this correction therein that the same may conform to the record of the case in the Patent Office.

Signed and sealed this 29th day of August, A. D. 1950.

[SEAL]

THOMAS F. MURPHY,
*Assistant Commissioner of Patents.*